(12) United States Patent
Tanigawa

(10) Patent No.: US 11,258,927 B2
(45) Date of Patent: Feb. 22, 2022

(54) NOISE REMOVAL DEVICE, NOISE REMOVAL METHOD, AND STILLNESS DETECTION METHOD

(71) Applicant: SOCIONEXT INC., Kanagawa (JP)

(72) Inventor: Satoru Tanigawa, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 17/002,737

(22) Filed: Aug. 25, 2020

(65) Prior Publication Data

US 2020/0389572 A1     Dec. 10, 2020

Related U.S. Application Data

(63) Continuation of application No. PCT/JP2018/007260, filed on Feb. 27, 2018.

(51) Int. Cl.
*H04N 5/21* (2006.01)
*H04N 19/85* (2014.01)
(Continued)

(52) U.S. Cl.
CPC .............. *H04N 5/21* (2013.01); *G06T 5/002* (2013.01); *G06T 5/50* (2013.01); *H04N 5/147* (2013.01); *H04N 19/85* (2014.11)

(58) Field of Classification Search
CPC .......... H04N 5/21; H04N 19/85; H04N 5/147; H04N 19/172; H04N 19/137;
(Continued)

(56) References Cited

U.S. PATENT DOCUMENTS 8,768,056 B2 * 7/2014 Okabe ................. G02B 21/365
                                                          382/173
2012/0081566 A1 * 4/2012 Cote ....................... H04N 5/225
                                                          348/222.1
(Continued)

FOREIGN PATENT DOCUMENTS

JP      H6-225178 A      8/1994
JP      H7-203442 A      8/1995
(Continued)

OTHER PUBLICATIONS

International Search Report and Written Opinion issued in International Patent Application No. PCT/JP2018/007260, dated May 15, 2018, with English translation.

*Primary Examiner* — Paulos M Natnael
(74) *Attorney, Agent, or Firm* — McDermott Will & Emery LLP

(57) ABSTRACT

A noise removal device includes a noise remover, a data compressor, a data decompressor, a stillness detector, and an output selector. For a second frame succeeding a first frame, the noise remover performs noise removal on input image data of the second frame to generate noise removed data, based on the input image data of the second frame and decompressed data of the first frame. For the second frame, the output selector: selects the input image data as output image data, when the stillness detector detects that the input image data is data of a still image; and selects the noise removed data as the output image data, when the stillness detector detects that the input image data is not the data of the still image.

7 Claims, 11 Drawing Sheets

(51) Int. Cl.
*G06T 5/00* (2006.01)
*G06T 5/50* (2006.01)
*H04N 5/14* (2006.01)

(58) Field of Classification Search
CPC .... H04N 19/117; H04N 19/86; H04N 19/136; G06T 5/002; G06T 5/50; G06T 2207/10016
See application file for complete search history.

(56) References Cited

U.S. PATENT DOCUMENTS

| | | | | |
|---|---|---|---|---|
| 2012/0308146 | A1* | 12/2012 | Uchida | H04N 19/182 |
| | | | | 382/232 |
| 2012/0308148 | A1 | 12/2012 | Uchida et al. | |
| 2012/0314951 | A1 | 12/2012 | Okabe | |
| 2013/0321672 | A1* | 12/2013 | Silverstein | G06T 5/005 |
| | | | | 348/241 |
| 2014/0010480 | A1* | 1/2014 | Cote | H04N 17/002 |
| | | | | 382/307 |
| 2014/0133749 | A1* | 5/2014 | Kuo | H04N 5/213 |
| | | | | 382/167 |
| 2020/0389572 | A1* | 12/2020 | Tanigawa | H04N 19/86 |

FOREIGN PATENT DOCUMENTS

| | | |
|---|---|---|
| JP | 2005-318251 A | 11/2005 |
| JP | 2012-253645 A | 12/2012 |
| JP | 2012-256980 A | 12/2012 |
| JP | 2016-163099 A | 9/2016 |

\* cited by examiner

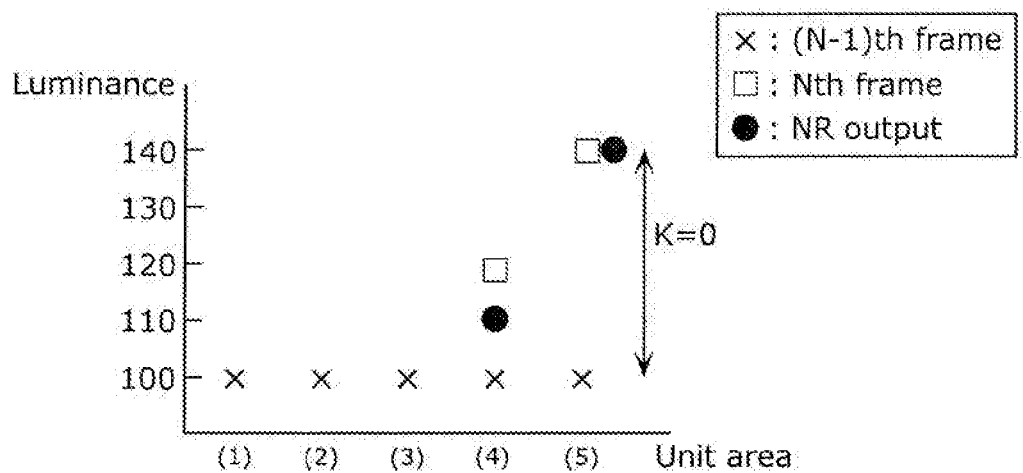

FIG. 5A
|  | (1) | (2) | (3) | (4) | (5) |
|---|---|---|---|---|---|
| (N−1)th frame | 100 | 100 | 100 | 100 | 120 |
| Nth frame | 100 | 100 | □ 100 | □ 100 | ☆ 120 |
| (N+1)th frame | 100 | 100 | 100 | 100 | 120 |
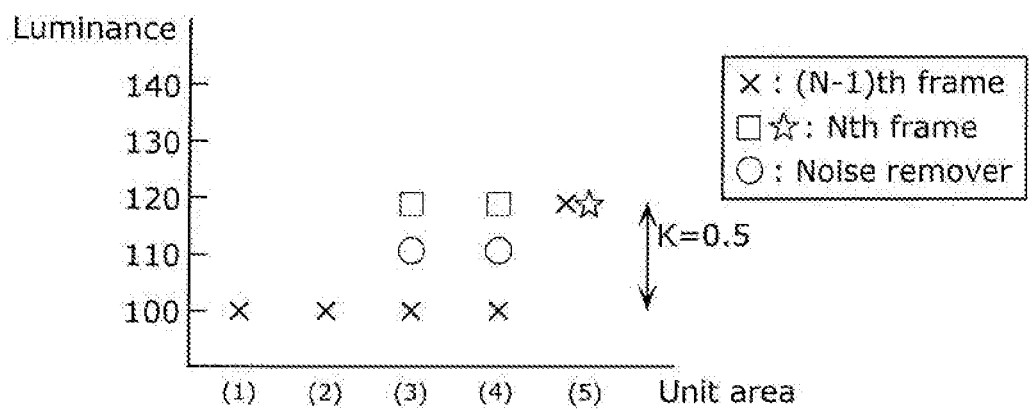
FIG. 5B
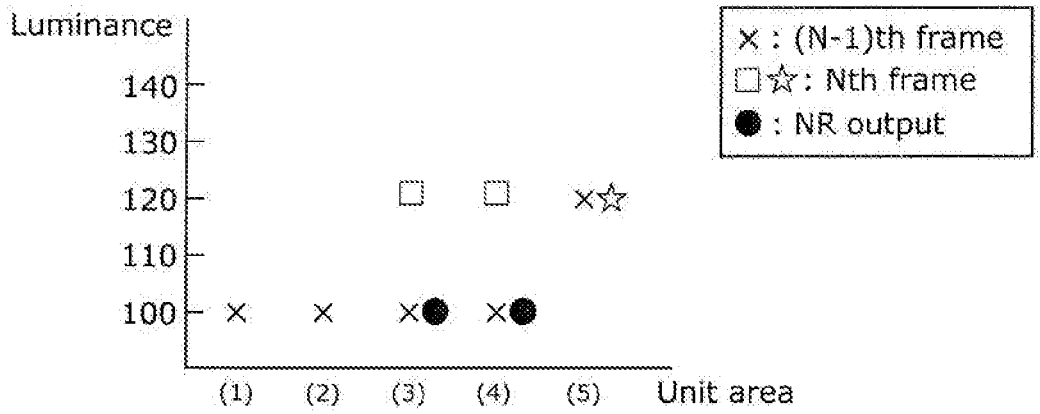
FIG. 5C

NOISE REMOVAL DEVICE, NOISE REMOVAL METHOD, AND STILLNESS DETECTION METHOD

CROSS REFERENCE TO RELATED APPLICATION

This is a continuation application of PCT Patent Application No. PCT/JP2018/007260 filed on Feb. 27, 2018, designating the United States of America. The entire disclosure of the above-identified application, including the specification, drawings and claims is incorporated herein by reference in its entirety.

FIELD

The present disclosure relates to a noise removal device, a noise removal method, and a stillness detection method.

BACKGROUND

In recent years, an increase in display apparatuses of 4K, 8K, and the like has led to an increase in the amount of data for video signal processing. Hence, in video signal processing technology using frame delay whereby signals are temporarily held in frame memory, video signal compression technology is used in order to reduce the bandwidth necessary for video signal processing (for example, see PTL 1). For example, bit compression technology (lossy compression) is used as such video signal compression technology.

CITATION LIST

Patent Literature

PTL 1: Japanese Unexamined Patent Application Publication No. 2005-318251

SUMMARY

Technical Problem

With bit compression technology, in the case where compressed video is restored to the original bit precision, the resultant data does not match the data before the compression. In such a case, if the video signal includes a still image, the still image flickers or an image different from the still image is output. This brings a sense of incongruity to the viewer.

The present disclosure has an object of providing a noise removal device and a noise removal method that enable display of a still image causing no sense of incongruity.

Solution to Problem

To solve the problem stated above, a noise removal device according to an aspect of the present disclosure is a noise removal device that performs noise removal on input image data, the noise removal device including: a noise remover that performs noise removal on input image data of each of frames to generate noise removed data, the frames including a first frame and a second frame succeeding the first frame; a data compressor that compresses the noise removed data to generate compressed data; a data decompressor that decompresses the compressed data to generate decompressed data; a stillness detector that detects whether the input image data is data of a still image; and an output selector that selects the input image data or the noise removed data as output image data, based on a result of the detection by the stillness detector, wherein, for the second frame, the noise remover performs the noise removal on input image data of the second frame to generate noise removed data, based on the input image data of the second frame and decompressed data of the first frame, and for the second frame, the output selector: selects the input image data as the output image data, when the stillness detector detects that the input image data is the data of the still image; and selects the noise removed data as the output image data, when the stillness detector detects that the input image data is not the data of the still image.

With this structure, whether input image data is data of a still image is detected. In the case where the input image data is data of a still image, the input image data is output. In the case where the input image data is not data of a still image, noise removed data is output. For data of a still image, the input data is output in unchanged form without being subjected to data compression, data decompression, and noise removal, so that there is no difference in data caused by processing of data compression, data decompression, and noise removal. Thus, a still image causing no sense of incongruity can be displayed by suppressing the influence of such a difference in data.

The stillness detector may include: a signal accumulator that accumulates a luminance signal included in the input image data of each of the frames; a comparator that compares an accumulated value of the luminance signal in the first frame and an accumulated value of the luminance signal in the second frame; and a determinator that determines one of the input image data and the noise removed data as the output image data, based on a result of the comparison by the comparator.

With this structure, the accumulated value of the luminance signal in the first frame and the accumulated value of the luminance signal in the second frame succeeding the first frame are compared. By determining whether the compared accumulated values are different, a still image can be detected accurately.

To solve the problem stated above, a noise removal device according to an aspect of the present disclosure is a noise removal device that performs noise removal on input image data, the noise removal device including: a noise remover that performs noise removal on input image data of each of frames to generate noise removed data, the frames including a first frame and a second frame succeeding the first frame; a data compressor that compresses the noise removed data to generate compressed data; a data decompressor that decompresses the compressed data to generate decompressed data; a stillness detector that detects whether the input image data is data of a still image; and an input selector that selects the input image data or the decompressed data as data to be input to the noise remover, based on a result of the detection by the stillness detector, wherein, for the second frame, the noise remover performs the noise removal on input image data of the second frame to generate noise removed data, based on the input image data of the second frame and decompressed data of the first frame, and for the second frame, the input selector: selects the input image data as the data to be input to the noise remover, when the stillness detector detects that the input image data is the data of the still image; and selects the decompressed data as the data to be input to the noise remover, when the stillness detector detects that the input image data is not the data of the still image.

With this structure, whether input image data is data of a still image is detected. In the case where the input image data is data of a still image, noise is removed from the input image data and the resultant data is output. In the case where the input image data is not data of a still image, noise is removed from decompressed data and the resultant data is output. Since data of a still image is not subjected to data compression and data decompression, the difference in data caused by processing of data compression and data decompression can be suppressed. Thus, a still image causing no sense of incongruity can be displayed.

The stillness detector may include: a signal accumulator that accumulates a luminance signal included in the input image data of each of the frames; a comparator that compares an accumulated value of the luminance signal in the first frame and an accumulated value of the luminance signal in the second frame; and a determinator that determines one of the input image data and the decompressed data as the data to be input to the noise remover, based on a result of the comparison by the comparator.

With this structure, the accumulated value of the luminance signal in the first frame and the accumulated value of the luminance signal in the second frame succeeding the first frame are compared. By determining whether the compared accumulated values are different, a still image can be detected accurately.

The comparator may determine that the input image data of the second frame is the data of the still image, when the accumulated value of the luminance signal in the first frame and the accumulated value of the luminance signal in the second frame are same.

With this structure, stillness detection is performed using the luminance signal that is always included in the input image data, so that a still image can be detected easily and accurately.

The noise remover may perform the noise removal on the input image data of the second frame, by mixing the input image data of the second frame and the decompressed data of the first frame at a predetermined ratio.

With this structure, the input image data of the second frame and the decompressed data of the first frame are mixed at the predetermined ratio to remove noise, as a result of which an image with a reduced sense of incongruity can be displayed while removing noise.

To solve the problem stated above, a noise removal method according to an aspect of the present disclosure is a noise removal method of performing noise removal on input image data, the noise removal method including: performing noise removal on input image data of a first frame to generate noise removed data; compressing the noise removed data to generate compressed data; and decompressing the compressed data to generate decompressed data, wherein the noise removal method includes, for a second frame succeeding the first frame: performing the noise removal on input image data of the second frame to generate noise removed data, based on the input image data of the second frame and the decompressed data of the first frame; detecting whether the input image data is data of a still image; outputting the input image data, when the input image data is detected to be the data of the still image; and outputting the noise removed data, when the input image data is detected to be not the data of the still image.

With this structure, whether input image data is data of a still image is detected. In the case where the input image data is data of a still image, the input image data is output. In the case where the input image data is not data of a still image, noise removed data is output. For data of a still image, the input data is output in unchanged form without being subjected to data compression, data decompression, and noise removal, so that there is no difference in data caused by processing of data compression, data decompression, and noise removal. Thus, a still image causing no sense of incongruity can be displayed by suppressing the influence of such a difference in data.

To solve the problem stated above, a stillness detection method according to an aspect of the present disclosure includes: accumulating a luminance signal included in input image data of a first frame; accumulating a luminance signal included in input image data of a second frame; and determining that the input image data of the second frame is data of a still image, when an accumulated value of the luminance signal in the first frame and an accumulated value of the luminance signal in the second frame are same.

With this structure, the accumulated value of the luminance signal in the first frame and the accumulated value of the luminance signal in the second frame succeeding the first frame are compared. By determining whether the compared accumulated values are the same, a still image can be detected accurately. Moreover, stillness detection is performed using the luminance signal that is always included in the input image data, so that a still image can be detected easily.

Advantageous Effects

According to the present disclosure, it is possible to provide a noise removal device, a noise removal method, and a stillness detection method that enable display of a still image causing no sense of incongruity.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4A is a diagram illustrating the level of the luminance signal in consecutive frames in the case where input image data is data of a moving image.

FIG. 4B is a diagram illustrating the level of the luminance signal of a display image of an Nth frame when processed by the noise removal device according to Embodiment 1 in the case where input image data is data of a moving image.

FIG. 5A is a diagram illustrating the level of the luminance signal in consecutive frames in the case where, when input image data is compressed and decompressed, a difference in data occurs between before and after the compression and decompression processing.

FIG. 5B is a diagram illustrating the level of the luminance signal of a display image of an Nth frame when processed by the noise removal device according to Embodiment 1 in the case where, when input image data is compressed and decompressed, a difference in data occurs between before and after the compression and decompression processing.

FIG. 5C is a diagram illustrating the level of the luminance signal of a display image that is output from the noise removal device according to Embodiment 1 In the case where, when input image data is compressed and decompressed, a difference in data occurs between before and after the compression and decompression processing.

DESCRIPTION OF EMBODIMENTS

Embodiments of a noise removal device and a noise removal method according to the present disclosure will be described in detail below, with reference to the drawings as appropriate. In the embodiments described below, the substantially same structural elements are given the same reference marks, and their description may be omitted.

The embodiments described below each show a specific example. The numerical values, shapes, materials, structural elements, the arrangement and connection of the structural elements, steps, the order of steps, etc. shown in the following embodiments are mere examples, and do not limit the scope of the present disclosure. Of the structural elements in the embodiments described below, the structural elements not recited in any one of the independent claims representing the broadest concepts are described as optional structural elements. Herein, description detailed more than necessary may be omitted. For example, detailed description of well-known matters or repeated description of the substantially same structures may be omitted. This is to avoid unnecessarily redundant description and facilitate the understanding of a person skilled in the art. In the following description, structures that are the same or are unchanged are given the same reference marks.

The accompanying drawings and the following description are provided to help a person skilled in the art to fully understand the present disclosure, and are not intended to limit the subject matter defined in the appended claims.

Embodiment 1

[1-1. Structure of Noise Removal Device]

Figure 1:
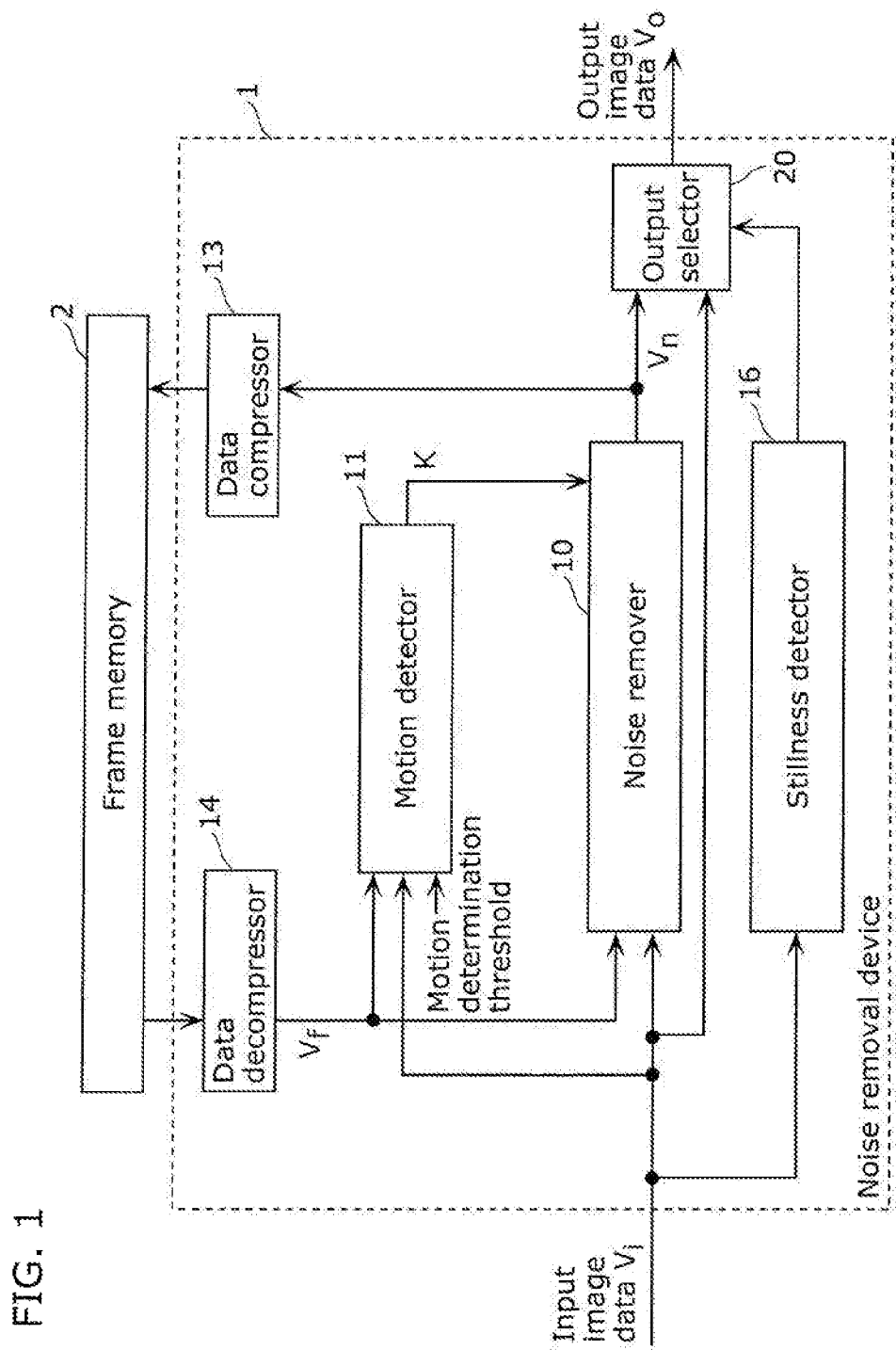
FIG. 1 is a block diagram illustrating a structure of a noise removal device according to Embodiment 1.
Figure 2:
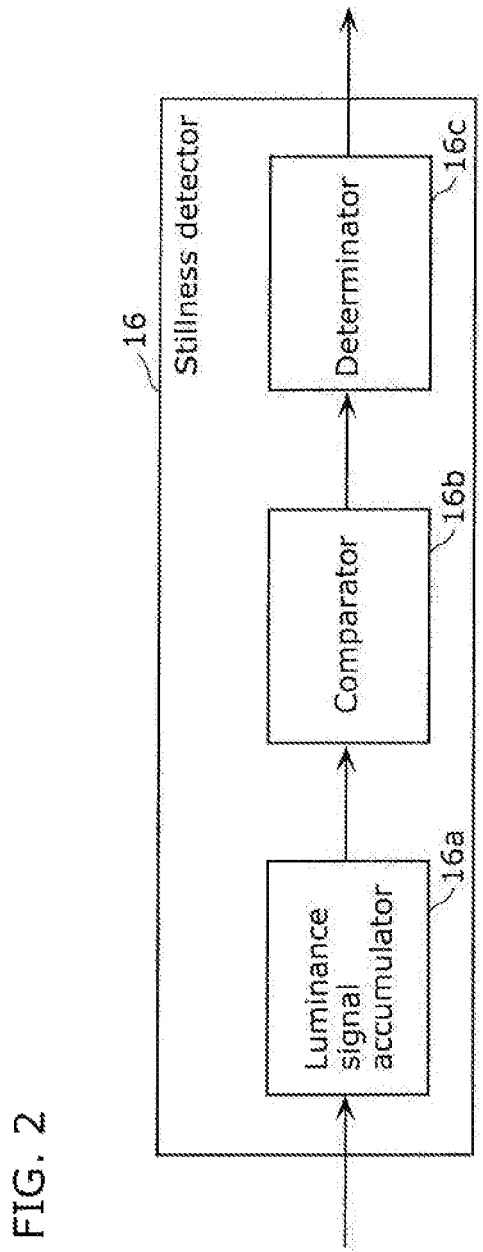
FIG. 2 is a diagram illustrating a structure of a stillness detector in the noise removal device according to Embodiment 1.

A structure of a noise removal device according to Embodiment 1 will be described first. FIG. 1 is a block diagram illustrating a structure of the noise removal device according to Embodiment 1. FIG. 2 is a diagram illustrating a structure of stillness detector 16 in noise removal device 1 according to this embodiment.

As illustrated in FIG. 1, noise removal device 1 according to this embodiment includes noise remover 10, motion detector 11, data compressor 13, data decompressor 14, stillness detector 16, and output selector 20. Noise removal device 1 is connected to frame memory 2 provided outside noise removal device 1. Noise remover 10 and motion detector 11 are each a cyclic noise reduction (NR) circuit used for noise removal involving frame delay.

Noise remover 10 is a processing unit that performs a process of removing noise from input image data Vi input to noise removal device 1. Input image data Vi includes a luminance signal having luminance information for displaying an input image. Noise remover 10 is implemented, for example, by a computer, a processor, or a circuit.

Noise remover 10 removes noise from input image data Vi input to noise removal device 1 using frame delay. That is, noise remover 10 mixes input image data Vi of a current frame input to noise removal device 1 and decompressed data Vf of an immediately preceding frame (i.e. one frame before the current frame) decompressed by data decompressor 14, to reduce the influence of noise on output image data Vo of the current frame. Herein, a process of removing noise from input image data Vi by noise remover and motion detector 11 is referred to as turning on the NR effect, and a process of not removing noise from input image data Vi is referred to as turning off the NR effect.

In more detail, noise remover 10 outputs noise removed data Vn obtained by mixing, at a predetermined ratio, input image data Vi input to noise removal device 1 and decompressed data Vf resulting from decompression by data decompressor 14. The predetermined ratio herein is coefficient K ($0 \leq K \leq 1$) such that noise removed data Vn satisfies $$Vn = (1-K) \times Vi + K \times Vf \qquad \text{(Equation 1)}.$$

For example, when K=0.5, Vn=0.5×Vi+0.5×Vf, and noise removed data Vn is data obtained by mixing input image data Vi and decompressed data Vf in equal proportion.

Motion detector 11 is a detector that compares decompressed data Vf resulting from decompression by data decompressor 14 with a motion determination threshold set beforehand, to detect whether the input image has motion.

In typical motion detection, motion in an image is detected based on the difference in signal level between frames. When the difference in signal between frames is smaller, the probability that the input signal contains noise is higher. When the difference in signal between frames is larger, the probability that the input signal is an image having motion is higher. Therefore, in the case where the difference in signal between frames is small, it is determined that the input signal contains noise and that the image is a still image.

Motion detector 11 determines the value of coefficient K from the motion detection result, and outputs the determined value of coefficient K to noise remover 10. Thus, noise remover 10 can output image data Vo from which noise has been removed, by mixing input image data Vi and decompressed data Vf at the predetermined ratio. Motion detector 11 may cause noise remover not to perform noise removal processing.

Data compressor 13 is a processing unit that is located upstream of frame memory 2 in order to save the memory capacity of frame memory 2 and performs a process of compressing an input video signal. Compressed data resulting from the compression by data compressor 13 is input to and held in frame memory 2.

Data decompressor 14 is a processing unit that performs a process of decompressing data compressed by data compressor 13. Decompressed data resulting from the decompression by data decompressor 14 is output to noise remover 10 and motion detector 11.

Stillness detector 16 includes luminance signal accumulator 16a, comparator 16b, and determinator 16c, as illustrated in FIG. 2.

Luminance signal accumulator 16a is, for example, a register, and is a signal accumulator that accumulates the luminance signal of one frame from input image data Vi. The accumulated luminance signal of one frame is held for each frame.

Comparator 16b is a processing unit that compares the accumulated values of the luminance signals of consecutive frames. As described later, when luminance signal accumulator 16a ends the accumulation of the luminance signal of the current frame, comparator 16b compares the accumulated value of the luminance signal of the current frame and the accumulated value of the luminance signal of the immediately preceding frame. In the case where the accumulated value of the luminance signal of the current frame and the accumulated value of the luminance signal of the immediately preceding frame are the same, comparator 16b determines that the image of the current frame is a still image. In the case where the accumulated value of the luminance signal of the current frame and the accumulated value of the luminance signal of the immediately preceding frame are not the same, comparator 16b determines that the image of the current frame is a moving image.

Determinator 16c is a processing unit that determines, based on the result of determination by comparator 16b, which of input image data Vi and noise removed data Vn resulting from noise removal is to be selected by output selector 20 as output image data Vo. In the case where comparator 16b determines that the image of the current frame is a still image, determinator 16c determines to cause output selector 20 to output input image data Vi. In the case where comparator 16b determines that the image of the current frame is a moving image, determinator 16c determines to cause output selector 20 to output noise removed data Vn. Determinator 16c outputs the result of determination to output selector 20.

Stillness detector 16 may detect whether the input image is a still image, from a signal other than the luminance signal. For example, stillness detector 16 may include, instead of luminance signal accumulator 16a, a signal accumulator that accumulates another signal which uses at least the luminance signal, such as an RGB signal or a YUV signal, and accumulate and compare the other signal.

Output selector 20 is a selector that selects output image data Vo output from noise removal device 1, based on the result of detection by stillness detector 16. Output selector 20 is, for example, a switch that switches between a signal path through which input image data Vi is transmitted and a signal path through which noise removed data Vn is transmitted.

In the case where stillness detector 16 detects that input image data Vi is a still image, output selector 20 selects a signal path so that input image data Vi will be output from noise removal device 1, based on the output result from determinator 16c in stillness detector 16. Consequently, the input image data from which noise has not been removed is output in unchanged form from noise removal device 1.

In the case where stillness detector 16 detects that input image data Vi is not a still image, output selector 20 selects a signal path so that noise removed data Vn obtained by removing noise by noise remover 10 in the immediately preceding frame will be output from noise removal device 1, based on the output result from determinator 16c in stillness detector 16. Consequently, noise removed data Vn obtained by removing noise from input image data Vi is output from noise removal device 1.

Frame memory 2 provided outside noise removal device 1 is a memory for delaying an input video signal which is a digital signal. As frame memory 2, for example, a general-purpose dynamic random access memory (DRAM) may be used. Frame memory 2 may be a first-in first-out (FIFO) memory. In the case where inter-field processing is performed, frame memory 2 is called a field memory. The use of frame memory 2 enables noise removal device 1 to function as a cyclic filter that performs noise removal by delaying an input image signal by one frame.

Data compressor 13 that compresses an input image signal is connected to the upstream side of frame memory 2, and data decompressor 14 that decompresses compressed data is connected to the downstream side of frame memory 2.

The following will describe processing by noise removal device 1 and a displayed image in each of: (a) the case where input image data is data of a still image and contains noise; (b) the case where input image data is data of a moving image; and (c) the case where, when input image data is compressed and decompressed, a difference in data occurs between before and after the compression and decompression processing.

Figures 3A, 3B:
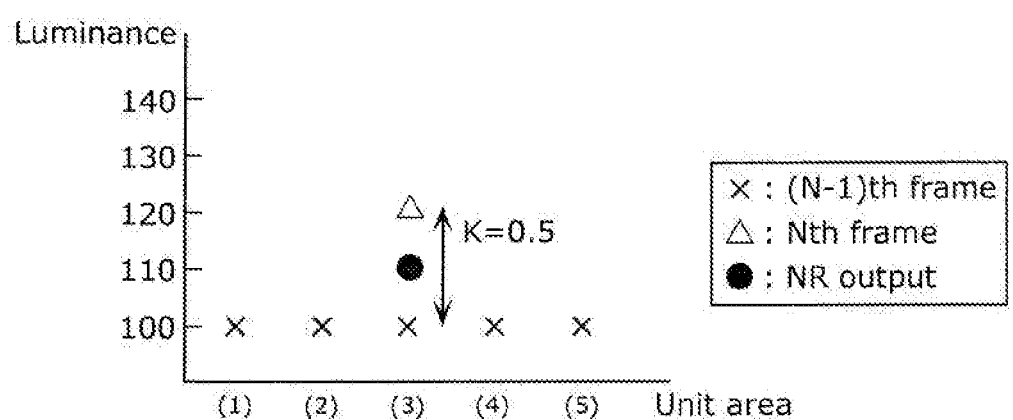
FIG. 3A is a diagram illustrating the level of a luminance signal in consecutive frames in the case where input image data is data of a still image and contains noise.
FIG. 3B is a diagram illustrating the level of the luminance signal of a display image of an Nth frame when processed by the noise removal device according to Embodiment 1 in the case where input image data is data of a still image and contains noise.

First, (a) the case where input image data is data of a still image and contains noise will be described below. FIG. 3A is a diagram illustrating the level of the luminance signal in consecutive frames in the case where input image data is data of a still image and contains noise. FIG. 3B is a diagram illustrating the level of the luminance signal of a display image of an Nth frame when processed by the noise removal device according to Embodiment 1 in the case where input image data is data of a still image and contains noise.

In FIGS. 3A and 3B, each numeric value represents the level of the luminance signal. In FIGS. 3A and 3B, (1) to (5) each represent a unit area (e.g. one pixel). In detail, the signal luminance level in each of unit areas (1) to (5) is illustrated in FIGS. 3A and 3B. The Nth frame is the current frame, the (N−1)th frame is the frame immediately preceding the current frame, and the (N+1)th frame is the frame immediately succeeding the current frame.

In FIG. 3A, the signal luminance levels in unit areas (1) to (5) in the (N−1)th frame, the Nth frame, and the (N+1)th frame are all "100" except unit area (3) in the Nth frame. From the continuity of the frames and the continuity of the level of the luminance signal in each frame, the input image data is presumed to be data indicating a still image. In this case, given that the level of the luminance signal is "120" in unit area (3) in the Nth frame as illustrated in FIG. 3A, it is presumed that noise is contained.

Accordingly, in noise removal device 1, noise removal processing is performed with K=0.5 in (Equation 1). Consequently, in unit area (3) in the Nth frame, as the output signal (NR output) after the noise removal, an image is displayed at the level "110" of the luminance signal which is the average of the level "120" of the luminance signal containing noise and the level "100" of the luminance signal not containing noise, as illustrated in FIG. 3B. In the other unit areas (1), (2), (4), and (5), an image is displayed at the level "100" of the luminance signal because no noise is contained.

Next, (b) the case where input image data is data of a moving image will be described below. FIG. 4A is a diagram illustrating the level of the luminance signal in consecutive frames in the case where input image data is data of a moving image. FIG. 4B is a diagram illustrating the level of the luminance signal of a display image of an Nth frame when processed by the noise removal device according to Embodiment 1 in the case where input image data is data of a moving image.

In FIGS. 4A and 4B, too, each numeric value represents the level of the luminance signal, and (1) to (5) each represent a unit area (e.g. one pixel). The Nth frame is the current frame, the (N−1)th frame is the frame immediately preceding the current frame, and the (N+1)th frame is the frame immediately succeeding the current frame.

The input image data is data of a moving image. As illustrated in FIG. 4A, in unit area (4), the level of the luminance signal changes from "100" in the (N−1)th frame to "120" in the Nth frame. In unit area (5), the level of the luminance signal changes from "100" in the (N−1)th frame to "140" in the Nth frame.

In unit area (5), the difference in the level of the luminance signal between the (N−1)th frame and the Nth frame is "40", which is large, and therefore it is determined that the image is a moving image. Accordingly, in noise removal device 1, processing is performed with K=0 in (Equation 1). Consequently, in unit area (5) in the Nth frame, an image is displayed at the level "140" as the level of the luminance signal (NR output) of the input image after the processing, as illustrated in FIG. 4B.

In unit area (4), the difference in the level of the luminance signal between the (N−1)th frame and the Nth frame is "20", which is small, and therefore it is determined that the Nth frame contains noise. Accordingly, noise removal processing is performed with K=0.5 in (Equation 1). Consequently, in unit area (4) in the Nth frame, as the output signal (NR output) after the noise removal, an image is displayed at the level "110" of the luminance signal which is the average of the level "120" of the luminance signal containing noise and the level "100" of the luminance signal not containing noise, as illustrated in FIG. 4B.

Next, (c) the case where, when input image data is compressed and decompressed, a difference in data occurs between before and after the compression and decompression processing will be described below. FIG. 5A is a diagram illustrating the level of the luminance signal in consecutive frames at the time of input in the case where, when input image data is compressed and decompressed, a difference in data occurs between before and after the compression and decompression processing. FIG. 5B is a diagram illustrating the level (white circle) of the luminance signal of a display image of an Nth frame that is output from the noise remover in the noise removal device according to Embodiment 1 in the case where, when input image data is compressed and decompressed, a difference in data occurs between before and after the compression and decompression processing (the level in unit areas (3) and (4) in the Nth frame, which is originally "100", is "120" due to the difference). FIG. 5C is a diagram illustrating the level (black circle) of the luminance signal of a display image that is output from the noise removal device in the same condition as in FIG. 5B.

In FIGS. 5A to 5C, too, each numeric value represents the level of the luminance signal, and (1) to (5) each represent a unit area (e.g. one pixel). The Nth frame is the current frame, the (N−1)th frame is the frame immediately preceding the current frame, and the (N+1)th frame is the frame immediately succeeding the current frame.

As a result of the input image data in the state illustrated in FIG. 5A undergoing compression and decompression, in unit areas (3) and (4), the level of the luminance signal is unchanged at "100" in the (N−1)th frame but the level of the luminance signal changes to "120" in the Nth frame and the (N+1)th frame, as illustrated in FIG. 5B. It is therefore presumed that the images of the (N−1)th frame, the Nth frame, and the (N+1)th frame are data of a still image but a difference in data occurs between before and after the compression and decompression processing.

In FIG. 5B, in unit areas (3) and (4), the difference in the level of the luminance signal between the (N−1)th frame and the Nth frame is "20", which is small. Accordingly, processing is performed with K=0.5 in (Equation 1). Consequently, in unit area (4) In the Nth frame, as the output signal (white circle) of the noise remover, an image with a difference in data between before and after the compression and decompression processing when the input image data is compressed and decompressed is generated at the level "110" of the luminance signal which is the average of the level "120" of the luminance signal containing noise and the level "100" of the luminance signal not containing noise.

However, the (N−1)th frame, the Nth frame, and the (N+1)th frame have the same accumulated value of the input luminance signal, i.e. "520", and accordingly stillness detector 16 determines that the input image data is data of a still image. Consequently, noise removal device 1 sets not the output signal (white circle) of the noise remover but the input image data as output image data (NR output), and outputs the level "100" of the luminance signal in unit areas (3) and (4).

Thus, even in the case where a difference in data occurs between before and after compression and decompression processing when a still image is Input, the difference can be reduced to reduce its influence on the display image.

In unit areas (1), (2), and (5), the luminance signal level is unchanged in the (N−1)th frame, the Nth frame, and the (N+1)th frame. Hence, the level "100" of the luminance signal is output in unit areas (1) and (2), and the level "120" of the luminance signal is output in unit area (5).

As described above, with noise removal device 1 according to this embodiment, even in the case where a difference in data occurs between before and after compression and decompression processing, a still image causing no sense of incongruity can be displayed by suppressing the influence of such a difference in data.

[1-2. Operation of Noise Removal Device]

Figure 6:
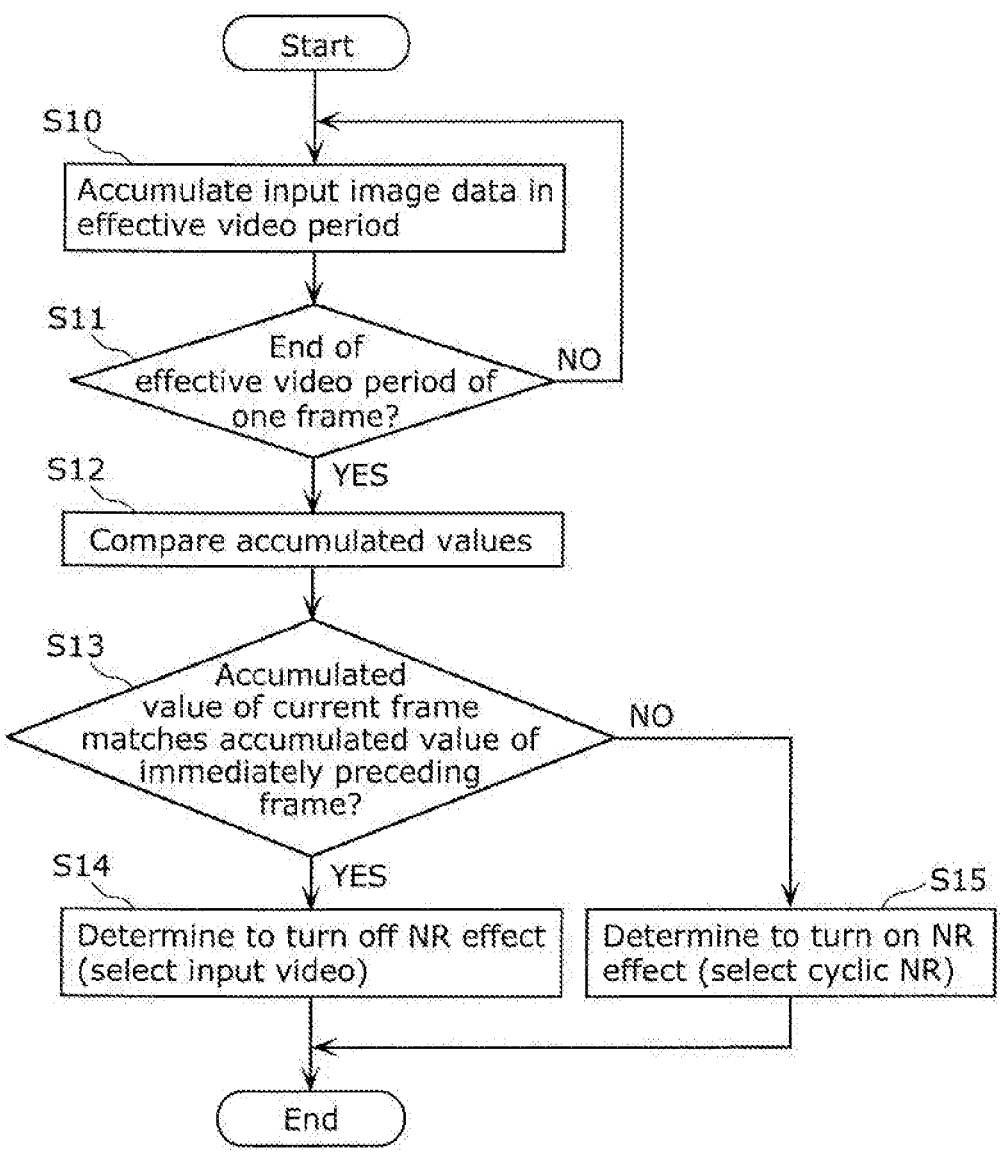
FIG. 6 is a flowchart illustrating a procedure of the noise removal device according to Embodiment 1.

Operation of noise removal device 1 will be described below. FIG. 6 is a flowchart illustrating a procedure of noise removal device 1 according to this embodiment.

Figure 7:
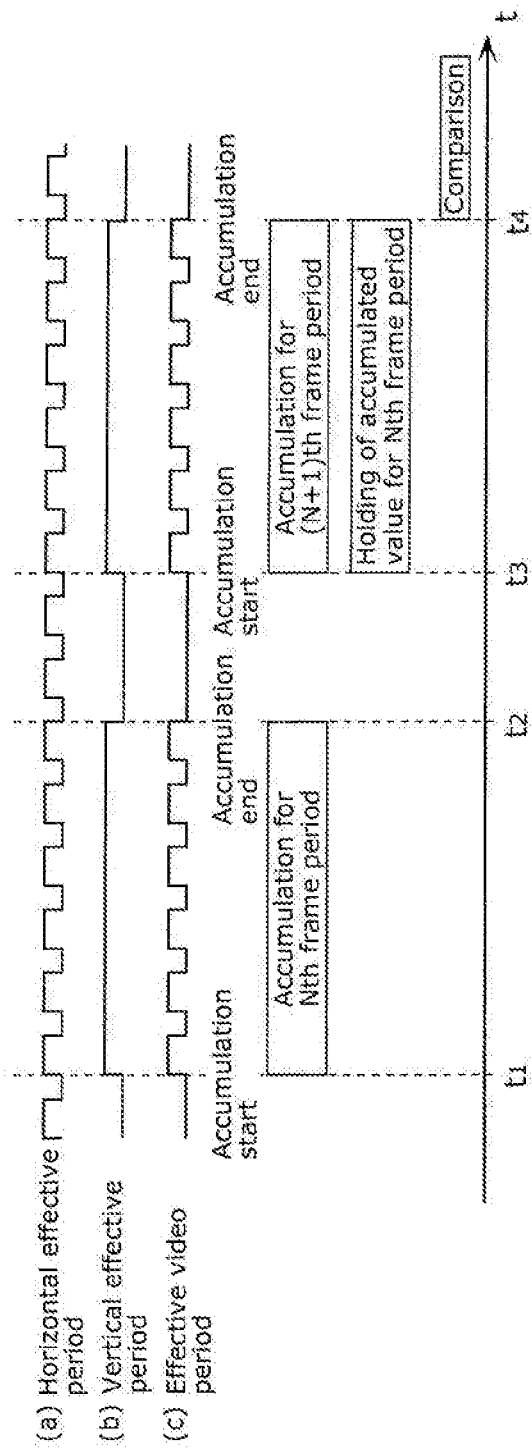
FIG. 7 is a timing chart illustrating operation of the noise removal device according to Embodiment 1.

As illustrated in FIG. 6, luminance signal accumulator 16a In stillness detector 16 in noise removal device 1 accumulates the luminance signal of input image data in an effective video period (Step S10). The effective video period is a period during which data of an image signal of one frame is input. As illustrated in FIG. 7 (described later), for example, the effective video period of the Nth frame is from time t1 to time t2, and the effective video period of the (N+1)th frame is from time t3 to time t4. Noise removal device 1 starts the accumulation of the luminance signal from the start of the effective video period, and, when the effective video period ends, ends the accumulation of the luminance signal (Step S11). In the case where the effective video period has not ended, noise removal device 1 continues the accumulation of the luminance signal (Step S11: NO).

When the effective video period of one frame ends (Step S11: YES), comparator 16b compares the accumulated value of the luminance signal accumulated by luminance signal accumulator 16a with the accumulated value of the luminance signal accumulated in the frame immediately preceding the current frame (Step S12). In the case where the accumulated value of the current frame and the accumulated value of the immediately preceding frame match (Step S13: YES), determinator 16c determines to turn off the NR effect (Step S14). That is, determinator 16c causes output selector 20 to perform selection to output input image data Vi. In the case where the accumulated value of the current frame and the accumulated value of the immediately preceding frame do not match (Step S13: NO), determinator 16c determines to turn on the NR effect (Step S15). That is, determinator 16c causes output selector 20 to perform selection to output noise removed data Vn.

FIG. 7 is a timing chart illustrating operation of noise removal device 1 according to a variation of this embodiment. As illustrated in FIG. 7, when the effective video period of the Nth frame starts at time t1, noise removal device 1 starts the accumulation of the luminance signal in the Nth frame. At time t2, noise removal device 1 ends the accumulation of the luminance signal in the Nth frame.

After this, when the effective video period of the (N+1)th frame starts at time t3, noise removal device 1 starts the accumulation of the luminance signal in the (N+1)th frame. At time t4, noise removal device 1 ends the accumulation of the luminance signal in the (N+1)th frame. From time t3 to time t4, the accumulated value of the luminance signal accumulated in the Nth frame is held. When the accumulation of the luminance signal in the (N+1)th frame ends at time t4, noise removal device 1 compares the accumulated value of the luminance signal in the Nth frame and the accumulated value of the luminance signal in the (N+1)th frame.

In the case where the difference between the accumulated values is 0 or is less than a predetermined threshold set beforehand, noise removal device 1 determines that the input image data is data of a still image. In this case, noise removal device 1 outputs input image data Vi as output image data Vo. In the case where the difference between the accumulated values is greater than the predetermined threshold, noise removal device 1 determines that the input image data is data of a moving image. In this case, noise removal device 1 outputs noise removed data Vn as output image data Vo.

Although not illustrated in the drawing, the accumulated value of the luminance signal accumulated in the (N−1)th frame and the accumulated value of the luminance signal accumulated in the Nth frame are compared from time t2 to t3.

[1-3. Effects, Etc.]

With noise removal device 1 having the structure described above, whether input image data is data of a still image is detected. In the case where the input image data is data of a still image, the input image data is output. In the case where the input image data is not data of a still image, noise removed data is output. For data of a still image, the input data is output in unchanged form without being subjected to data compression, data decompression, and noise removal, so that there is no difference in data caused by processing of data compression, data decompression, and noise removal. Thus, a still image causing no sense of incongruity can be displayed by suppressing the influence of such a difference in data.

Variation of Embodiment 1

Figure 8:
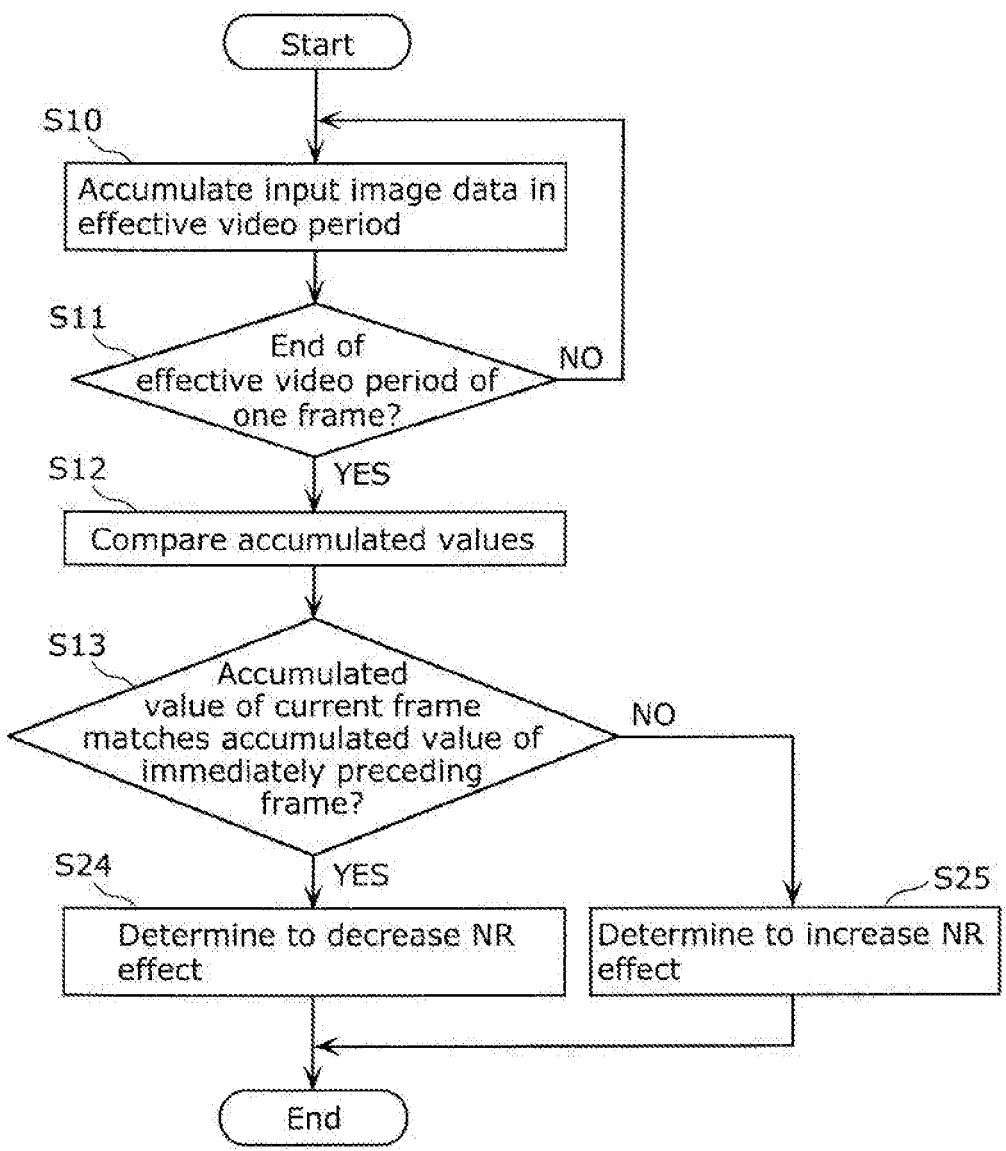
FIG. 8 is a flowchart illustrating a procedure of a noise removal device according to a variation of Embodiment 1.

FIG. 8 is a flowchart illustrating a procedure of noise removal device 1 according to a variation of Embodiment 1.

In noise removal device 1 according to Embodiment 1 described above, noise remover 10 turns off or on the NR effect based on the determination by determinator 16c. Alternatively, noise remover 10 may perform control to decrease or increase the NR effect based on the determination by determinator 16c.

In detail, as illustrated in FIG. 8, in the case where determinator 16c determines that the accumulated value of the luminance signal of the current frame matches the accumulated value of the luminance signal of the immediately preceding frame (Step S13: YES), noise remover 10 performs control to decrease the NR effect (Step S24). For example, noise remover 10 decreases the value of K from 0.5 to 0.3. Thus, an image with decreased NR effect can be output by changing the mixing ratio between input image data Vi and noise removed data Vn.

In the case where determinator 16c determines that the accumulated value of the luminance signal of the current frame does not match the accumulated value of the luminance signal of the immediately preceding frame (Step S13: NO), noise remover 10 performs control to increase the NR effect (Step S25). For example, noise remover 10 increases the value of K from 0.5 to 0.7. Thus, an image with increased NR effect can be output by changing the mixing ratio between input image data Vi and noise removed data Vn.

Embodiment 2

[2-1. Structure and Operation of Noise Removal Device]

A noise removal system and noise removal device 100 according to Embodiment 2 will be described below. Noise removal device 100 according to this embodiment differs from noise removal device 1 according to Embodiment 1 in that it includes input selector 120 that switches signal data input to noise remover 110.

Figure 9:
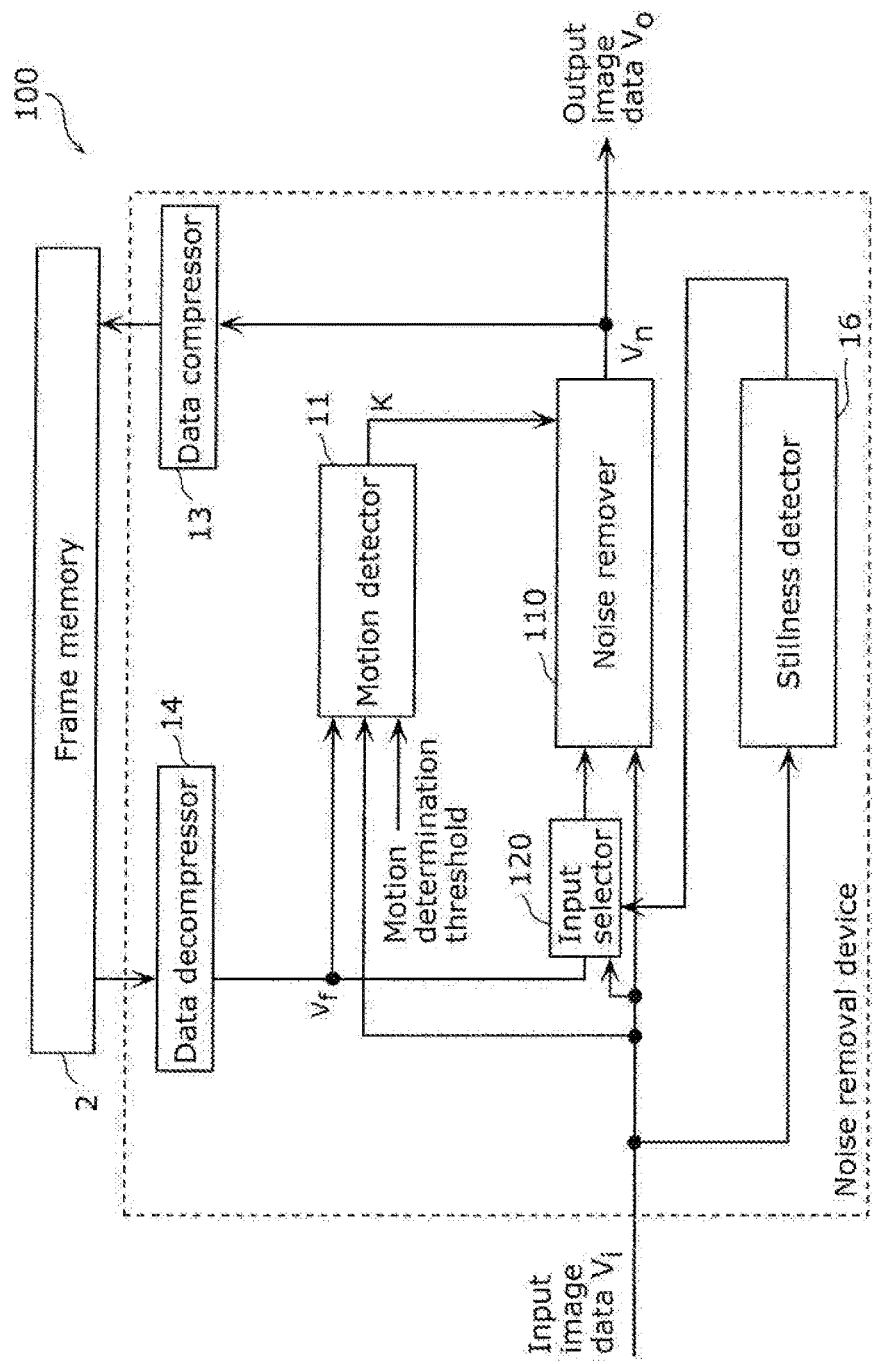
FIG. 9 is a block diagram illustrating a structure of a noise removal device according to Embodiment 2.

FIG. 9 is a block diagram illustrating a structure of noise removal device 100 according to this embodiment.

As illustrated in FIG. 9, noise removal device 100 includes noise remover 110, motion detector 11, data compressor 13, data decompressor 14, stillness detector 16, and input selector 120. Noise removal device 100 is connected to frame memory 2 provided outside noise removal device 100. The structures of noise remover 110, motion detector 11, data compressor 13, data decompressor 14, and stillness detector 16 are the same as noise remover 10, motion detector 11, data compressor 13, data decompressor 14, and stillness detector 16 in Embodiment 1, and accordingly their detailed description is omitted. Noise remover 110 and motion detector 11 are structures used for noise removal involving frame delay.

Noise removal device 100 does not include output selector 20 included in noise removal device 1 according to Embodiment 1. Moreover, in noise removal device 100, output data output from stillness detector 16 is input to input selector 120.

Input selector 120 is a selector that selects signal data input to noise remover 110, based on the result of detection by stillness detector 16. Input selector 120 is, for example, a switch that switches between a signal path through which input image data Vi is transmitted and a signal path through which decompressed data Vf is transmitted and connects the selected signal path to noise remover 110.

Specifically, in the case where stillness detector 16 detects that input image data Vi is a still image, input selector 120 selects a signal path so that input image data Vi will be input to noise remover 110.

In the case where stillness detector 16 detects that input image data Vi is a still image, input selector 120 selects a signal path so that input image data Vi will be input to noise remover 110, based on the output result from determinator 16c in stillness detector 16. Consequently, the input image data is input to noise remover 110.

In the case where stillness detector 16 detects that input image data Vi is not a still image, input selector 120 selects a signal path so that decompressed data Vf obtained in the immediately preceding frame will be input to noise remover 110, based on the output result from determinator 16c in stillness detector 16. Consequently, decompressed data Vf of the immediately preceding frame is input to noise remover 110 as the data of the current frame.

Input image data Vi or decompressed data Vf input to noise remover 110 is subjected to noise removal processing by noise remover 110 according to (Equation 1), and the resultant data is output as noise removed data Vn. This noise removed data Vn is output from noise removal device 100 as output image data Vo.

The procedure in noise removal device 100 is the same as the procedure in noise removal device 1 according to each of Embodiment 1 and the variation of Embodiment 1.

[2-2. Effects, Etc.]

With noise removal device 100 having the structure described above, whether input image data is data of a still image is detected. In the case where the input image data is data of a still image, noise is removed from the input image data and the resultant data is output. In the case where the input image data is not data of a still image, noise is removed from decompressed data and the resultant data is output. Since data of a still image is not subjected to data compression and data decompression, the difference in data caused by processing of data compression and data decompression can be suppressed. Thus, a still image causing no sense of incongruity can be displayed.

OTHER EMBODIMENTS

While a noise removal device according to an aspect of the present disclosure has been described above by way of embodiments and the like, the present disclosure is not limited to these embodiments. For example, other embodiments in which structural elements herein described are combined with one another in any manner or in which some structural elements are excluded may be used as embodiments of the present disclosure. Variations obtained by making, on the foregoing embodiments, various modifications conceived by a person skilled in the art without departing from the gist of the present disclosure, that is, without departing from the meaning indicated by the claim wording, are also included in the present disclosure.

Figure 10:
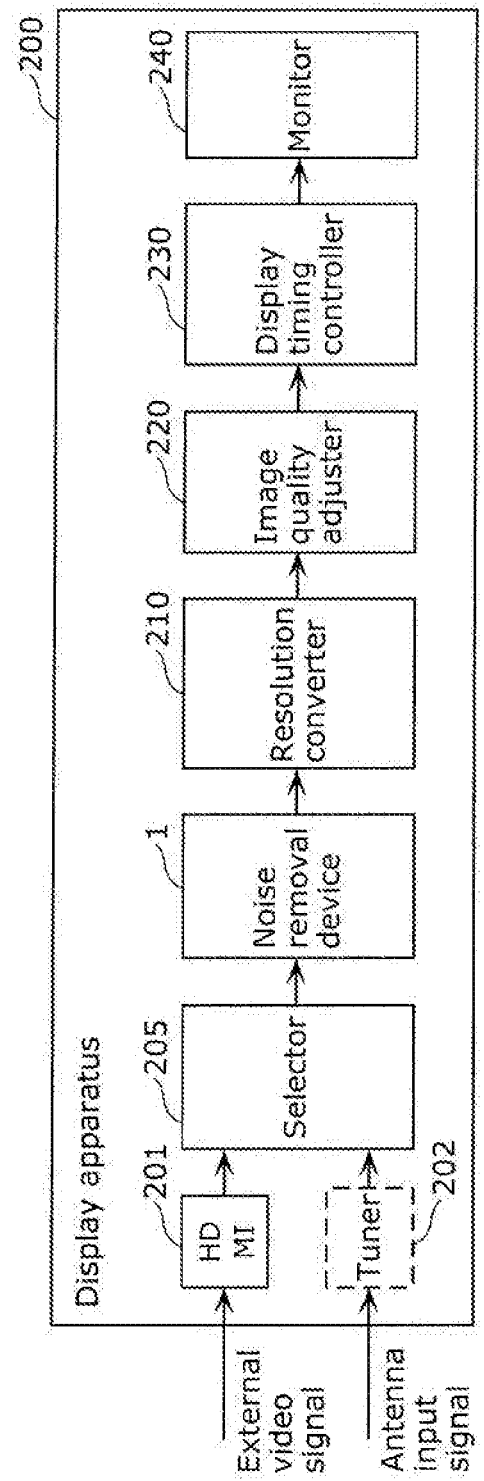
FIG. 10 is a block diagram illustrating a structure of a display apparatus using the noise removal device according to Embodiment 1.
Figure 11:
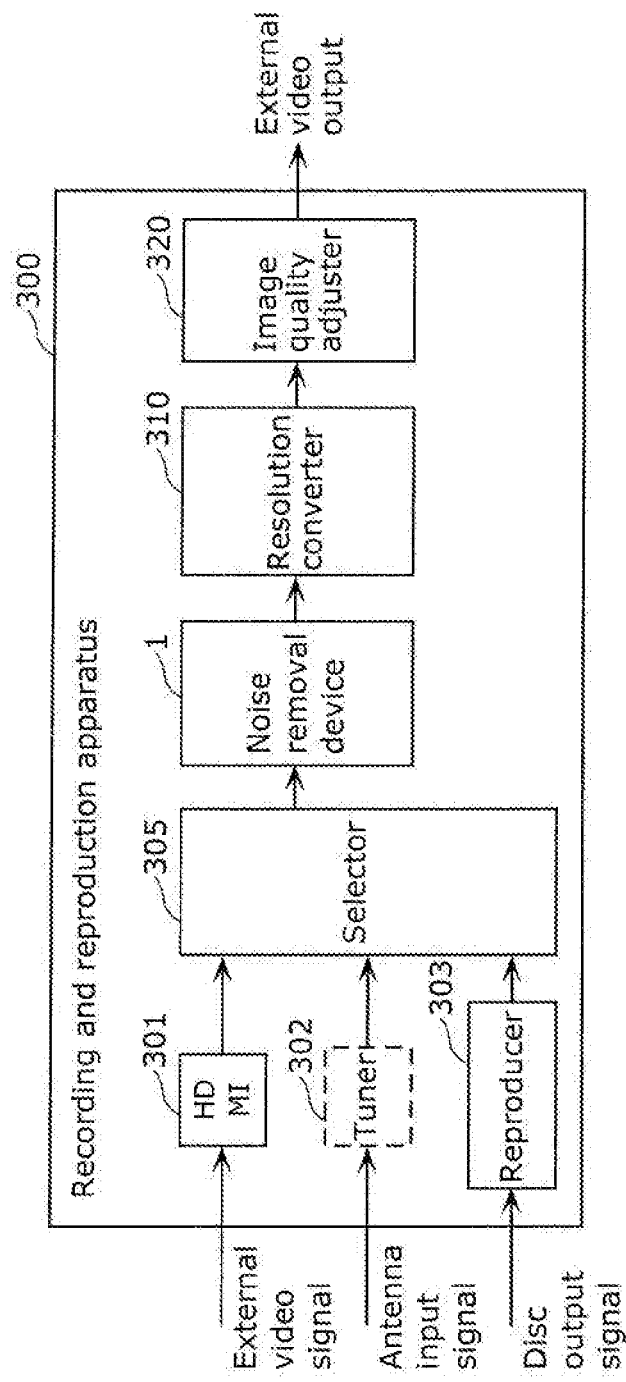
FIG. 11 is a block diagram illustrating a structure of a recording and reproduction apparatus using the noise removal device according to Embodiment 1.

For example, noise removal device 1 described in the foregoing embodiment may be included in an apparatus such as a display apparatus or a recording and reproduction apparatus, as illustrated in FIGS. 10 and 11. The same applies to noise removal device 1 according to the variation of Embodiment 1 and noise removal device 100 according to Embodiment 2.

FIG. 10 is a block diagram illustrating a structure of a display apparatus using noise removal device 1 according to Embodiment 1. Display apparatus 200 illustrated in FIG. 10 includes HDMI® 201, tuner 202, selector 205, noise removal device 1, resolution converter 210, image quality adjuster 220, display timing controller 230, and monitor 240.

An external video signal is input to HDMI® 201. An antenna input signal is input to tuner 202. Selector 205 performs switching so that the input external video signal or antenna input signal will be input to noise removal device 1.

Noise removal device 1 performs the foregoing noise removal processing on the input external video signal or antenna input signal. Resolution converter 210 and image quality adjuster 220 adjust the resolution and image quality of noise removed data obtained by the noise removal processing, respectively. Display timing controller 230 controls the display timing of the noise removed data whose resolution and image quality have been adjusted, and monitor 240 displays the data.

Thus, display apparatus 200 can display a still image causing no sense of incongruity, on monitor 240.

FIG. 11 is a block diagram illustrating a structure of a recording and reproduction apparatus using noise removal device 1 according to Embodiment 1. Recording and reproduction apparatus 300 illustrated in FIG. 11 includes HDMI® 301, tuner 302, disc reproducer 303, selector 305, noise removal device 1, resolution converter 310, and image quality adjuster 320.

An external video signal is input to HDMI® 301. An antenna input signal is input to tuner 302. A video signal is input to disc reproducer 303 from a recording medium such as BD, DVD, or SD. Selector 205 performs switching so that the input external video signal, antenna input signal, or video signal will be input to noise removal device 1.

Noise removal device 1 performs the foregoing noise removal processing on the input external video signal, antenna input signal, or video signal. Resolution converter 210 and image quality adjuster 220 adjust the resolution and image quality of noise removed data obtained by the noise removal processing, respectively. Recording and reproduction apparatus 300 outputs the resultant data to another apparatus such as an external display apparatus.

Thus, recording and reproduction apparatus 300 can display a still image causing no sense of incongruity, on the external display apparatus or the like.

While a noise removal device, a noise removal method, and a stillness detection method according to the present disclosure have been described above by way of embodiments, the present disclosure is not limited to these embodiments. Other modifications obtained by applying various changes conceivable by a person skilled in the art to the embodiments and any combinations of the structural elements in different embodiments without departing from the scope of the present disclosure are also included in the scope of the present disclosure.

For example, although the above describes the case where the stillness detector detects a still image from the luminance signal of one frame, the stillness detector may detect whether the input image is a still image from a signal other than the luminance signal. For example, the stillness detector may include, instead of the luminance signal accumulator, a signal accumulator that accumulates another signal which uses at least the luminance signal, such as an RGB signal or a YUV signal, and accumulate and compare the other signal.

The motion detector may change the value of coefficient K and cause the noise remover to perform noise removal processing, or cause the noise remover not to perform noise removal processing.

In the present disclosure, each of the structural elements in the noise removal device may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or semiconductor memory. Each of the structural elements may be realized by means of an LSI which is an integrated circuit, a dedicated circuit, a general-purpose processor, an FPGA, or a reconfigurable processor where circuit cell connections and settings within the LSI can be reconfigured.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

A noise removal device according to the present disclosure is applicable to a display apparatus, a recording and reproduction apparatus, etc. for displaying both a moving image and a still image.

The invention claimed is:

1. A noise removal device that performs noise removal on input image data, the noise removal device comprising:
    a noise remover that performs noise removal on input image data of each of frames to generate noise removed data, the frames including a first frame and a second frame succeeding the first frame;
    a data compressor that compresses the noise removed data to generate compressed data;
    a data decompressor that decompresses the compressed data to generate decompressed data;
    a stillness detector that detects whether the input image data is data of a still image; and
    an output selector that selects the input image data or the noise removed data as output image data, based on a result of the detection by the stillness detector,
    wherein, for the second frame, the noise remover performs the noise removal on input image data of the second frame to generate noise removed data, based on the input image data of the second frame and decompressed data of the first frame, and
    for the second frame, the output selector:
    selects the input image data as the output image data, when the stillness detector detects that the input image data is the data of the still image; and
    selects the noise removed data as the output image data, when the stillness detector detects that the input image data is not the data of the still image.

2. The noise removal device according to claim 1, wherein the stillness detector includes:
    a signal accumulator that accumulates a luminance signal included in the input image data of each of the frames;
    a comparator that compares an accumulated value of the luminance signal in the first frame and an accumulated value of the luminance signal in the second frame; and
    a determinator that determines one of the input image data and the noise removed data as the output image data, based on a result of the comparison by the comparator.

3. A noise removal device that performs noise removal on input image data, the noise removal device comprising:
    a noise remover that performs noise removal on input image data of each of frames to generate noise removed data, the frames including a first frame and a second frame succeeding the first frame;
    a data compressor that compresses the noise removed data to generate compressed data;
    a data decompressor that decompresses the compressed data to generate decompressed data;
    a stillness detector that detects whether the input image data is data of a still image; and
    an input selector that selects the input image data or the decompressed data as data to be input to the noise remover, based on a result of the detection by the stillness detector,
    wherein, for the second frame, the noise remover performs the noise removal on input image data of the second frame to generate noise removed data, based on the input image data of the second frame and decompressed data of the first frame, and
    for the second frame, the input selector:
    selects the input image data as the data to be input to the noise remover, when the stillness detector detects that the input image data is the data of the still image; and
    selects the decompressed data as the data to be input to the noise remover, when the stillness detector detects that the input image data is not the data of the still image.

4. The noise removal device according to claim 3, wherein the stillness detector includes:
    a signal accumulator that accumulates a luminance signal included in the input image data of each of the frames;
    a comparator that compares an accumulated value of the luminance signal in the first frame and an accumulated value of the luminance signal in the second frame; and
    a determinator that determines one of the input image data and the decompressed data as the data to be input to the noise remover, based on a result of the comparison by the comparator.

5. The noise removal device according to claim 2, wherein the comparator determines that the input image data of the second frame is the data of the still image, when the accumulated value of the luminance signal in the first frame and the accumulated value of the luminance signal in the second frame are same.

6. The noise removal device according to claim 1, wherein the noise remover performs the noise removal on the input image data of the second frame, by mixing the input image data of the second frame and the decompressed data of the first frame at a predetermined ratio.

7. A noise removal method of performing noise removal on input image data, the noise removal method comprising:
    performing noise removal on input image data of a first frame to generate noise removed data;
    compressing the noise removed data to generate compressed data; and
    decompressing the compressed data to generate decompressed data,
    wherein the noise removal method comprises, for a second frame succeeding the first frame:
    performing the noise removal on input image data of the second frame to generate noise removed data, based on the input image data of the second frame and the decompressed data of the first frame;

detecting whether the input image data is data of a still image;
outputting the input image data, when the input image data is detected to be the data of the still image; and
outputting the noise removed data, when the input image data is detected to be not the data of the still image.

\* \* \* \* \*